Patented Oct. 27, 1931

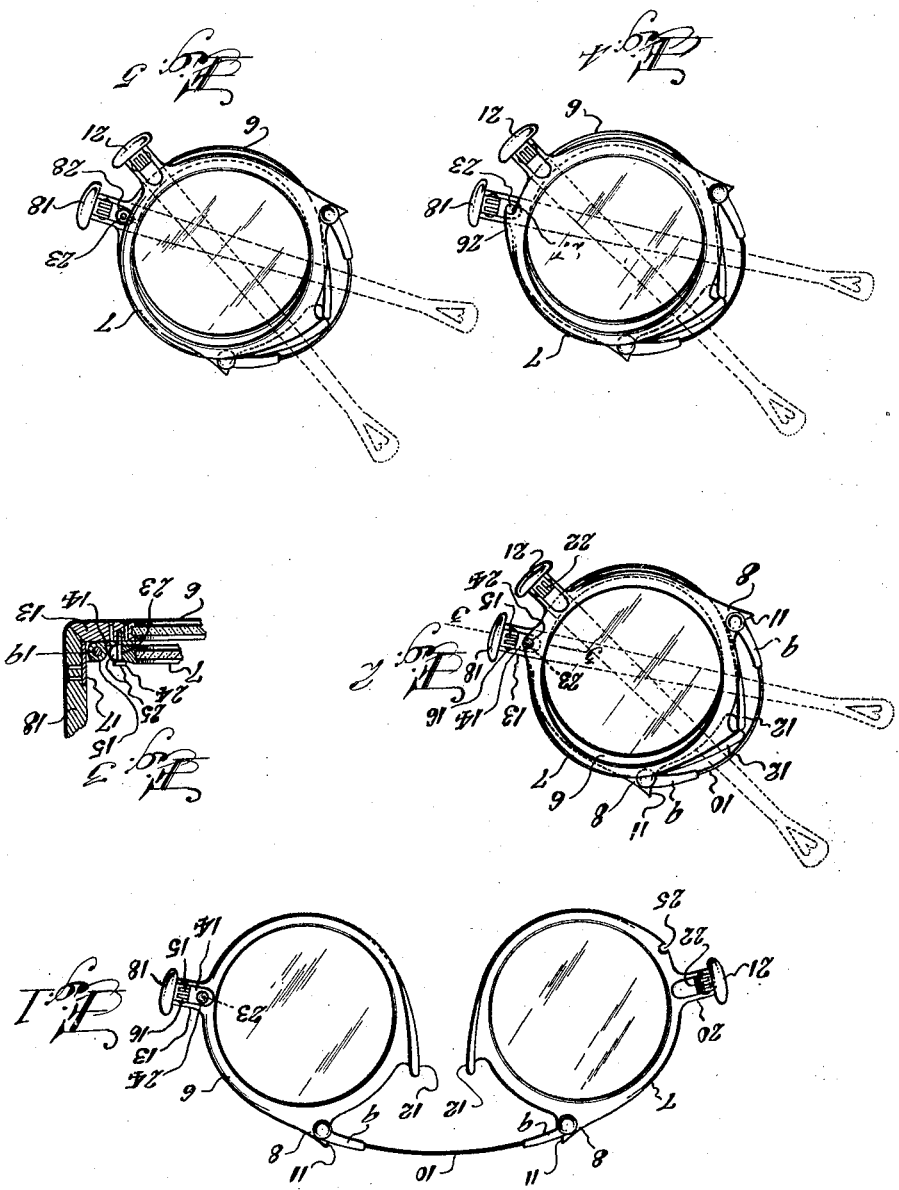

1,828,847

UNITED STATES PATENT OFFICE

JACOB J. POMERANZ, OF BROOKLYN, NEW YORK

FOLDING EYEGLASS FRAME

Application filed March 18, 1929. Serial No. 347,936.

This invention relates, generally, to improvements in eye-glasses; and the invention has reference, more particularly, to improvements in folding eye-glasses of the Oxford type, but provided with hinged temples and novel means to releasably lock the lens rims in folded relation one over the other.

This invention has for its principal object to provide folding eye-glass frames having temples hinged thereto and means to releasably lock the lens rims in folded relation, comprising a lock-stud rigidly supported in connection with a leaf of one of the temple hinges connected with one lens rim, and means connected with the other lens rim to cooperate with said lock-stud to releasably retain said latter lens rim in folded relation to the first mentioned lens rim.

The principles of construction involved in this invention are of especial advantage in connection with eye-glass frames made of tortoise-shell, pyroxylin and similar materials, since the lock-stud is strongly and rigidly supported in connection with the metallic temple hinge leaf, and consequently all strain upon the more fragile material of the lens frames is eliminated as the lock-stud is firmly supported and reenforced against direct exertion of lateral strain on the lens frame material, which material tends to split or fracture under such strains when alone affording the footing support for lock-studs.

Other objects of this invention, not at this time more particularly enumerated, will be clearly understood from the following detailed description of the same.

Illustrative embodiments of this invention are shown in the accompanying drawings, in which:—

Fig. 1 is an inside face view of a pair of folding eye-glasses made according to and embodying the principles of this invention, the same being shown in opened position ready for use; Fig. 2 is a similar view of the same with the lens rims shown folded together and secured by the releasable locking means of this invention, the hinged temples being shown in full lines in opened position, and by dotted lines in their folded position relative to the folded lens rims; Fig. 3 is a fragmentary sectional view, taken on line 3—3 in Fig. 2 but drawn on a somewhat enlarged scale; Fig. 4 is a view similar to that shown in Fig. 2, but illustrating a modified form of releasable locking means; and Fig. 5 is also a similar view showing another modified form of releasable means.

Similar characters of reference are employed in all of the hereinabove described views, to indicate corresponding parts.

Referring to the drawings, the reference characters 6 and 7 respectively indicate the respective lens rims of the eye-glass frame. These lens rims may be made of tortoise shell, pyroxylin or other suitable material. Each lens rim is provided at the upper part thereof with an ear 8 to which is pivotally secured an anchor-box 9 to which is fixedly secured an end of a flexible bridge spring 10. Said bridge spring 10 serves to connect the lens rims 6 and 7 in properly spaced apart relation. Each ear 8 is provided with a stop portion 11 which abuts against a portion of the anchor-box 9 connected therewith, so as to limit outward turning displacement of the lens rims, and whereby the pressure of the bridge spring may be normally exerted upon the lens rims to press the same toward each other, and thereby cause the nose-pad portions 12 on the inner sides of the lens rims to grippingly engage the nose of the wearer, when the eye-glasses are worn.

The lens rim 6 is provided at its outer side with an outwardly projecting lug 13 to the inner face of which is riveted or otherwise suitably secured, a metallic hinge leaf 14 having hinge knuckles 15 to cooperate with hinge knuckles 16 of another metallic hinge leaf 17 with which a temple 18 is provided. A hinge pin 19 is engaged through the cooperating hinge knuckles 15 and 16 to thereby hingedly connect said temple 18 to the lens frame 6. In like manner, the lens rim 7 is provided with an outwardly projecting lug 20 and a temple 21 hingedly connected therewith by a similar metallic hinge structure 22.

Threaded into or otherwise rigidly coupled with the hinge leaf 14 on the lug 13 of the lens rim 6 is an upstanding lock stud 23, which is thus rigidly and firmly footed in the metallic hinge structure, and is therefore so reenforced by the latter as to not only itself easily withstand lateral strains but also in such manner as to avoid imparting stresses and strains to the more fragile lens rim material underlying said hinge structure. If desired, said lock-stud 23 may be provided with an enlarged head 24 at its upper free end.

The lens rim 7 is provided in its exterior margin and spaced somewhat below the position of its lug 20 with an indented notch 25. That portion of the lens rim 7 in which said notch 25 is located may be slightly enlarged as shown if so desired.

When it is desired to fold up the eye-glass frame to reduce the same to a compact bulk, the lens rim 7 is swung toward and over the inner face of the lens rim 6, the flexible bridge spring 10 easily yielding to such movement. In thus moving the lens rim 7 relative to the lens rim 6, the perhiphery of the former is brought against the lock-stud 23 and then slid along the same until the notch 25 registers therewith so that the lock-stud 23 enters the latter. The tension stored in the bridge-spring 10, as the same is bent or flexed to permit of the described folding movement, tends to maintain the notch 25 in interlocked relation to the lock-stud 23, thus retaining the lens rims 6—7 in the folded relation in which they are disposed. After the lens rims 6—7 are thus folded, the temples 18 and 21 may be in turn folded down across the folded lens rims, to thereupon occupy the folded positions indicated by the dotted lines in Fig. 2.

To release the lens rims 6—7 from folded relation, the user merely presses the lens rim 7 forwardly away from the lock stud 23, thus freeing the latter from the notch 25, whereupon the restraint on the tension of the bridge spring 10 is released, and consequently said bridge-spring will resume its normal unflexed condition, thereby swinging out said lens rim 7 back to normal opened relation to to the lens rim 6.

In Figure 4 I have shown a slightly modified form of locking notch for the lens rim 7. In this modified construction I provide the lens rim 7 with a projecting nose member 26 providing a cam-like lift or inclined member tangent to the external periphery of the lens rim. The end of this nose member 26 forms a shoulder in which a notch-like seat 27 is provided. When the lens rim 7 is swung toward and over the lens rim 6, the nose member 26 rides against the lock-stud 23 until the end of the former is reached whereupon the latter drops into the notch-like seat 27, the parts being maintained in the resulting engagement by the tension of the flexed bridge spring 10. In other respects the structure of Fig. 3 is the same as that already described.

In Fig. 5 I have shown another modified form of locking structure. In this form instead of providing the lens rim 7 with a lock-stud engaging means in the form of a notch in the periphery thereof, I secure to the lens rim 7, a metallic eye-member or ring 28 arranged to project outwardly therefrom. When such lock ring 28 is employed the head 24 of the lock-stud 23 is eliminated. With this modified arrangement of locking structure, the lens rim 7 is moved until the lock ring 28 approaches the lock-stud whereupon a slight lifting movement is imparted to the lens rim 7 to lift the lock ring over the end of the lock-stud 23 so that the latter may enter the opening of the lock-ring, thus interlocking the parts together, as shown in said Fig. 5 of the drawings.

It will be obvious that in all the described structures, due to the relation of the lock-stud to the metallic hinge structure, a firm rigid support for the lock-stud is provided which relieves the more fragile material of the lens rims from the strains and stresses which would be exerted thereon when the lock structure is operatively engaged if the lock-stud was merely imbedded or footed in the lens rim material alone.

Having thus described my invention, I claim:—

1. Foldable eye-glass frames comprising, non-metallic lens rims, a flexible bridge spring interconnecting said lens rims, each lens rim having an integral outwardly projecting lug at its outer side and in the plane thereof, foldable temples, metallic hinge structures to pivotally connect said temples to said lens rims including hinge leaves superimposed on the inner faces of said lugs and fixedly secured thereto, a lock-stud threaded into the thus arranged hinge leaf of one lens rim to project at right angles to the plane of the latter, and the other lens rim having means to engage said lock-stud when the such lens rim is folded over said first mentioned lens rim to thereby releasably retain the lens rims in folded together relation.

2. Foldable eye-glass frames comprising, non-metallic lens rims, a flexible bridge spring interconnecting said lens rims, each lens rim having an integral outwardly projecting lug at its outer side and in the plane thereof, foldable temples, metallic hinge structures to pivotally connect said temples to said lens rims including hinge leaves superimposed on the inner faces of said lugs and fixedly secured thereto, a metallic lock-stud secured to the thus arranged hinge leaf of one lens rim to project at right angles to the plane of the latter, and the other lens rim having a notch in its exterior periphery to embrace said lock-stud when said lens rims are folded together one over the other to thereby releasably retain the same in such folded relation.

In testimony, that I claim the invention set forth above I have hereunto set my hand this 13th day of March, 1929.

JACOB J. POMERANZ.